(12) United States Patent
Tsuyuguchi

(10) Patent No.: US 6,469,858 B1
(45) Date of Patent: Oct. 22, 2002

(54) MOTOR CURRENT CONSUMPTION CONTROL SYSTEM FOR A FLEXIBLE MAGNETIC DISK DRIVE OR THE LIKE

(75) Inventor: Hiroshi Tsuyuguchi, Tokyo (JP)

(73) Assignee: TEAC Corporation (JP)

( * ) Notice: Subject to any disclaimer, the term of this patent is extended or adjusted under 35 U.S.C. 154(b) by 0 days.

(21) Appl. No.: 09/557,385

(22) Filed: Apr. 25, 2000

(30) Foreign Application Priority Data

Apr. 23, 1999 (JP) .......................................... 11-116193

(51) Int. Cl.⁷ .............................................. G11B 15/46
(52) U.S. Cl. ................................ 360/73.03; 360/73.01; 360/272; 360/281.7
(58) Field of Search ............................. 360/73.03, 272, 360/281.7, 78.13, 73.01

Primary Examiner—David Hudspeth
Assistant Examiner—Fred F. Tzeng

(74) Attorney, Agent, or Firm—Woodcock Washburn LLP

(57) ABSTRACT

A disk drive for use with interchangeable flexible magnetic disks of potentially different weights, comprising a disk drive motor for imparting rotation to a disk loaded therein, and a stepper motor for moving a transducer across the track turns on the disk. Since the current consumption of the disk drive motor is subject to change according to the weight of each disk being driven, a current detector circuit is provided for detecting the magnitude of the current being consumed by the disk drive motor. A current control circuit controls the magnitude of the current supplied to the stepper motor in inverse proportion to the detected magnitude of the disk drive motor current. The stepping pulse rate is also varied for making the rotational speed of the stepper motor higher with a decrease in the magnitude of the disk drive motor current. Thus the seek speed is made progressively higher as the disk weight grows less, without increasing the total current requirement of the disk drive.

10 Claims, 9 Drawing Sheets

MOTOR CURRENT CONSUMPTION CONTROL SYSTEM FOR A FLEXIBLE MAGNETIC DISK DRIVE OR THE LIKE

BACKGROUND OF THE INVENTION

This invention relates to an apparatus for data transfer with a rotating data storage disk such as, typically, a flexible magnetic disk commonly known as floppy disk and, more particularly, to a flexible magnetic disk drive suitable for connection as a peripheral to a personal computer via a universal serial bus (USB) interface. Still more particularly, the invention concerns how to reduce the maximum current requirement of such a disk drive at a minimal sacrifice of the seek speed, specifically dealing with the interrelated control of the current consumptions of a disk drive motor and a transducer positioning motor.

There recently have been introduced to the market the personal computers that have what is called a universal serial bus (USB) port for connection to a set of peripherals via serial USB interfaces. A plurality of peripherals, each with a USB interface, may be connected to what is termed a USB hub via separate USB cables and thence to the USB port of the computer via a single USB cable. USB connections are generally acknowledged to greatly enhance the utility and versatility of personal computer systems.

There has, however, been a problem left unsolved in connection with the USB interfacing of personal computers and peripherals. The power supply buses of USB cables are capable of carrying a current of no more than 500 milliamperes, a prerequisite demanding that the maximum current requirement of each computer peripheral be within that limit. More conventional flexible magnetic disk drives, for example, that are not designed for USB interfacing have a maximum current requirement ranging from 600 to 800 mA. Difficulties have therefore been experienced in designing disk drives, among other peripherals, that meet the current carrying capacity of USB cables.

The difficulties have been caused for the most part by the large current consumptions of a disk drive motor and a transducer positioning motor, both invariably incorporated in a disk drive to enable the transducers to access the individual storage locations on the disk for reading or writing. The combined current requirement of the two motors occupies a very substantive percentage of the total current requirement of the disk drive.

A conventional solution to this problem has been to make the current consumption of the transducer positioning motor less than that in universal disk drives that are not designed for USB interfacing with computers. The total current requirement of the USB interfaced disk drive has thus been made not to exceed the 500 mA limit at the sacrifice of the seek speed.

In a flexible magnetic disk drive for use with interchangeable disks, which vary considerably in weight, the current consumption of the disk drive motor is subject to change in the range of approximately 100 to 300 mA according to the particular weight of each disk it is driving. The current consumption of the transducer positioning motor, on the other hand, has been so predetermined that the total current consumption of the disk drive, including the maximum level of current consumption of the disk drive motor for disks of the heaviest weight class, may fall within the limit.

Consequently, when a disk of less than the heaviest weight class is loaded, the current consumption of the disk drive motor falls below the maximum level, but that of the positioning motor has so far been left unchanged. An unutilized margin has thus been created between the 500 mA limit of USB cables and the total current consumption of the disk drive whenever a disk of less than the prescribed maximum weight class is loaded therein.

SUMMARY OF THE INVENTION

It is therefore an object of this invention to make utmost use of the margin, so far wasted, between the 500 mA limit of USB cables and the total current consumption of the disk drive when a disk of less than the prescribed maximum weight class is being driven.

A more specific object of the invention is to make the seek speed of a USB interfaced disk drive or like computer peripheral higher in inverse proportion to the magnitude of the current being consumed by a disk drive motor, by taking advantage of the fact the current consumption of the disk drive motor lessens when it is driving disks of less than the prescribed maximum weight class.

Stated in brief, the present invention provides a data storage apparatus for use with interchangeable data storage disks of potentially different weights, comprising a disk drive motor for imparting rotation to a data storage disk loaded in the apparatus, and a positioning motor for moving a transducer across track turns on the disk. Also included are current detector means for detecting the magnitude of an electric current being consumed by the disk drive motor when the latter is driving the loaded data storage disk at a prescribed speed, current control means for controlling the magnitude of a current supplied to the positioning motor in inverse proportion to the detected magnitude of the current being consumed. by the disk drive motor, and speed control means for varying the speed of rotation of the positioning motor in inverse proportion to the detected magnitude of the current being consumed by the disk drive motor.

In a preferred embodiment the disks to be interchangeably loaded n the apparatus are classified into three weight classes, heavy, average, and light. Which of these weight classes each disk belongs to is determined by the current detector means by detecting the current consumption of the disk drive motor driving that disk, the current consumption of the disk drive motor being proportional to the disk weight. In response to the resulting output from the current detector means, the current control means determines the current supplied to the positioning motor in one of three predetermined levels, and the speed control means determines the rotational speed of the positioning motor in one of three predetermined levels.

The seek speed is therefore the same as heretofore for disks of the heavy weight class, but definitely higher for disks of the average weight class, and even higher for disks of the light weight class. These improvements in seek speed are accomplished with the total current consumption of the disk drive motor and the positioning motor maintained no more than heretofore for disks of all the weight classes.

The classification of the disks into several weight categories, and the provision of as many seek speeds each suiting one weight category, are, however, not an essential feature of the instant invention. The seek speed may be varied infinitely for each disk of a particular weight, as also taught herein.

The above and other objects, features and advantages of this invention and the manner of achieving them will become more apparent, and the invention itself will best be understood, from a study of the following description and attached claims, with reference had to the accompanying drawings showing the preferred embodiments of the invention.

DESCRIPTION OF THE PREFERRED EMBODIMENTS

Figure 1:
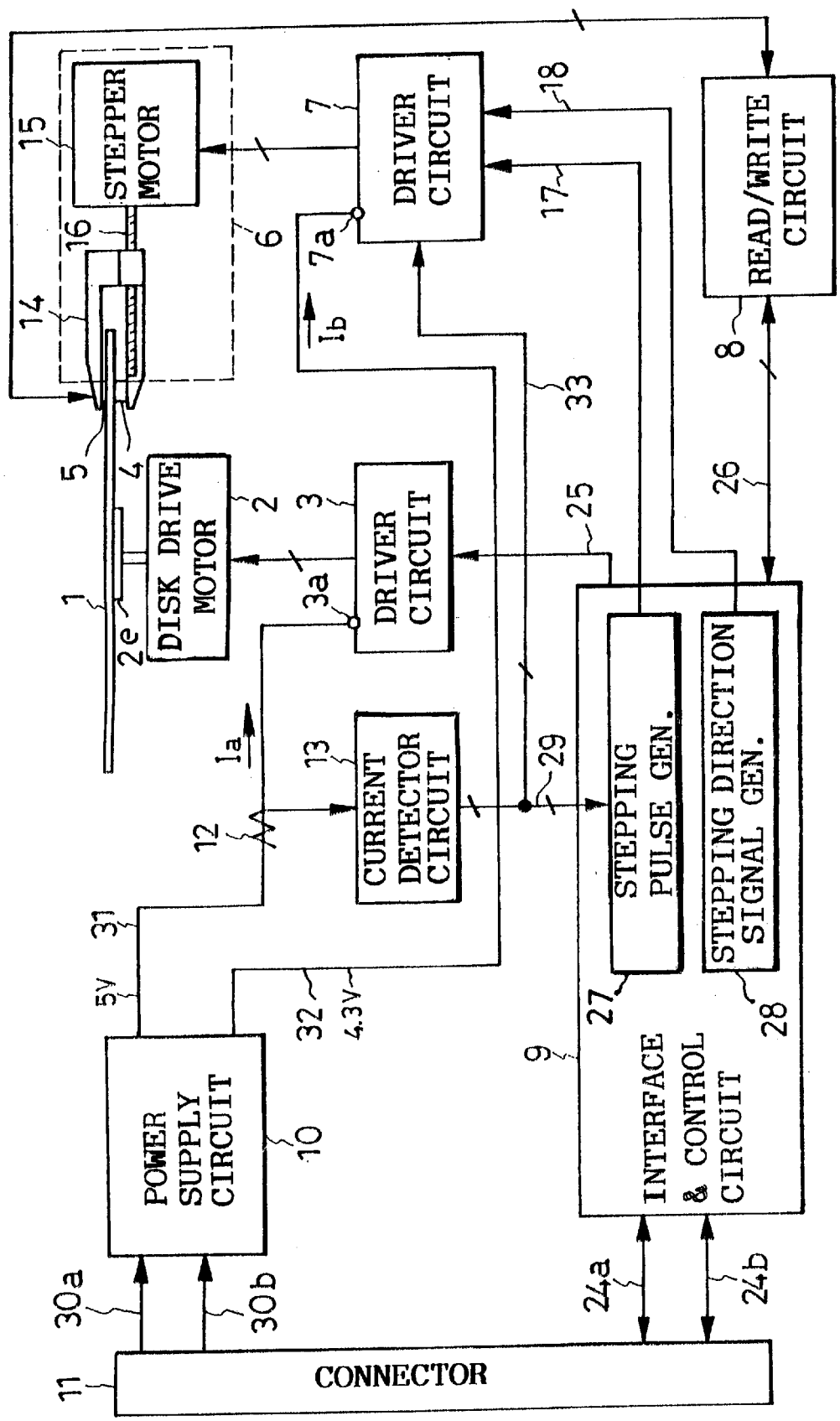
FIG. 1 is a block diagram of the disk drive embodying the principles of this invention, shown together with a flexible magnetic disk replaceably mounted in position therein.

The present invention is currently believed to be best embodied in a flexible magnetic disk drive to be USB interfaced with a personal computer. FIG. 1 diagrammatically illustrates such a disk drive together with a double-sided flexible magnetic disk 1 replaceably mounted in position on a turntable 2e. The disk drive is intended for use with this and many other disks of potentially different weights.

Broadly, the illustrated disk drive comprises a disk drive motor 2 for imparting rotation to the. turntable 2e and hence to the disk 1 loaded and clamped thereon, a motor driver circuit 3 for controllably driving the disk drive motor, a pair of transducers or magnetic read/write heads 4 and 5 for reading and writing data on the opposite sides of the disk, transducer positioning means 6 including a bidirectional stepper motor 15 for moving the transducers across the tracks on the disk and positioning them on any desired track location, a positioning motor driver circuit 7, a read/write circuit 8 connected to both transducers, an interface and control circuit 9 for controlling various working parts of the disk drive including the motor driver circuits. 3 and 7 and the read/write circuit 8, a power supply circuit 10 for powering the disk drive motor and the positioning motor, a connector 11 for connecting the disk drive to a personal computer, not shown, and a current detector element 12 and current detector circuit 13 for controlling the current consumption of the stepper motor 15 according to the magnitude of the current being actually consumed by the disk drive motor 2 according to the novel concepts of this invention.

There are many other standard components and mechanisms in the disk drive, such as the disk loading: mechanism, index sensor, Track Zero sensor, etc. All such conventional parts are not shown because of their impertinence to the invention.

Inserted into the disk drive, the disk 1 will be conventionally automatically loaded on the turntable 2e. This turntable is mounted fast on a spindle shown coupled directly to the disk drive motor 2 for joint rotation therewith. The motor 2 may be a brushless or like direct current motor. The disk is driven by this motor at 300 or 360 revolutions per minute for reading or writing. Connected between disk drive motor 2 and control circuit 9, the motor driver circuit 3 sets the motor into rotation in response to a MOTOR ON signal from the control circuit. At 3a is indicated the supply terminal of the driver circuit 3, which terminal will be referred to in more detail presently.

Figure 2:
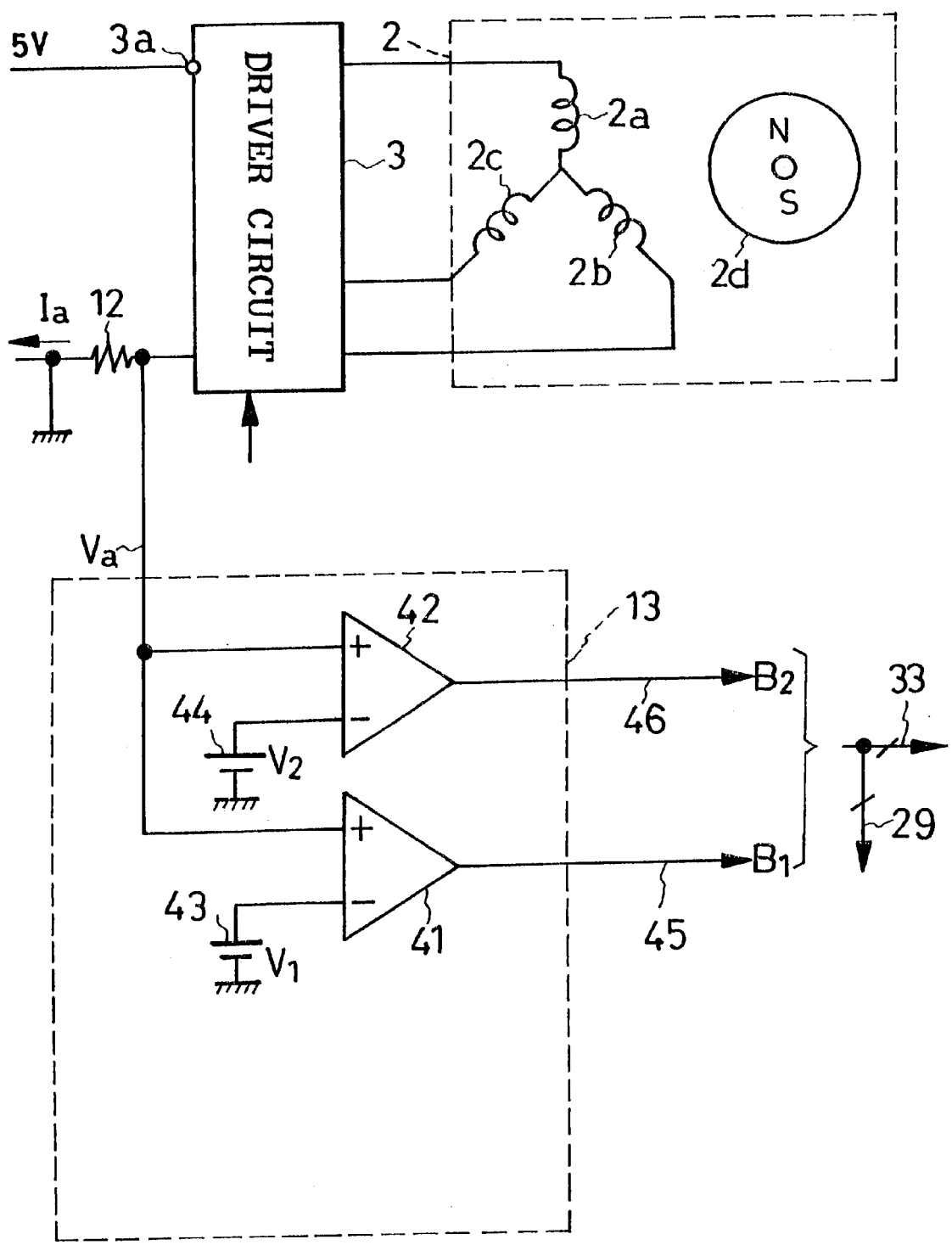
FIG. 2 is a schematic electrical diagram of the disk drive motor, disk drive motor driver circuit, and current detector circuit of the FIG. 1 disk drive.

As indicated in FIG. 2, the disk drive motor 2 comprises first 2a, second 2b and third 2c phase windings and a permanent magnet rotor 2d This figure will be later referred to for discussion of the current detector circuit 13.

With referenced back to FIG. 1, the transducer positioning means 6 include the stepper motor 15 as aforesaid for moving the pair of transducers 4 and 5 across the tracks on both sides of the disk 1 and for positioning them on any desired track position. To this end the stepper motor 15 is coupled via a motion translating mechanism such as a lead screw 16 to a carriage 14 to which both transducers 4 and 5 are mounted. The stepper motor driver circuit 7, having a supply terminal 7a, controllably drives the stepper motor 15, causing the same to rotate by discrete increments in either of two opposite directions. for positioning the transducers 4 and 5 on any desired track positions on the disk. The interface and control circuit 9 delivers stepping pulses and a stepping direction signal to the stepper motor driver circuit 7 over lines 17 and 18, respectively.

Figure 3:
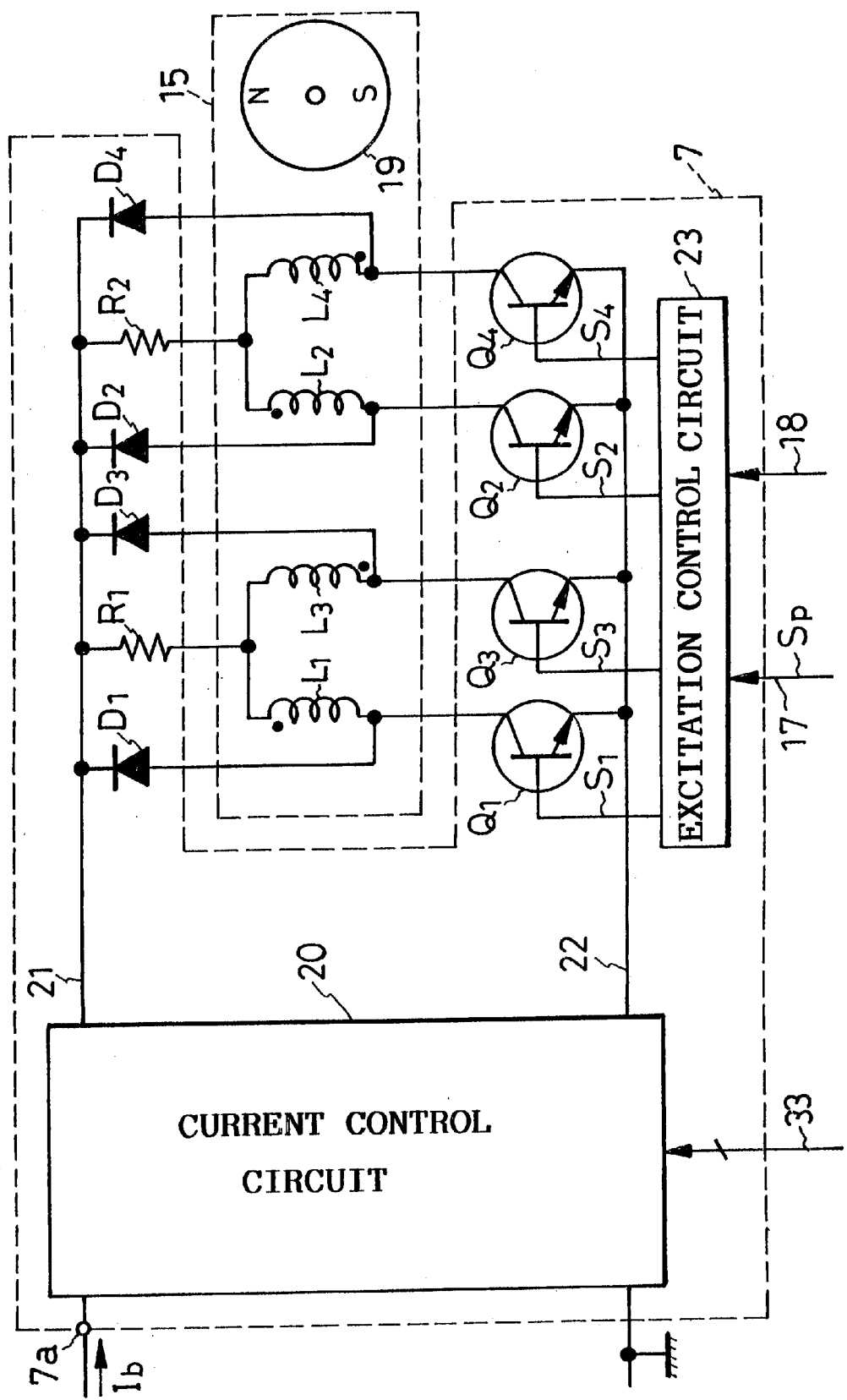
FIG. 3 is a schematic electrical diagram of the four-phase stepper motor for transporting the pair of transducers across data tracks on the disk in the FIG. 1 disk drive, shown together with a stepper motor driver circuit.

FIG. 3 is a more detailed illustration of the stepper motor 15 and its driver circuit 7. The stepper motor 15 is shown as that of fourphase design, having four phase stator windings $L_1$, $L_2$, $L_3$ and $L_4$ and a permanent magnet rotor 19. The first $L_1$ and third $L_3$ phase windings are wound in opposite directions around the same part of a magnetic core, not shown, and the second $L_2$ and fourth $L_4$ phase windings in opposite directions on another part of the core.

For unipolar driving of the four-phase stepper motor 15, the driver circuit 7 comprises a current control circuit 20, a pair of d.c. supply lines 21 and 22, an excitation control circuit 23, four switching transistors $Q_1$, $Q_2$, $Q_3$ and $Q_4$, four diodes $D_1$, $D_2$, $D_3$ and $D_4$, and two resistors $R_1$ and $R_2$. Connected between the supply terminal 7a and the pair of supply lines 21 and 22, the current control circuit 20 controls the magnitude of the current flowing over the stepper motor supply lines 21 and 22 according to the magnitude of the current being consumed by the disk drive motor 2. More will be said presently about this stepper motor current control circuit 20.

The switching transistors $Q_1$–$Q_4$ are all connected between the pair of d.c. supply lines 21 and 22 via the four phase stator windings $L_1$–$L_4$, respectively, of the stepper motor 15. The first resistor $R_1$ is connected in parallel with the first stepper motor winding $L_1$ via the first diode $D_1$, and with the third stepper motor winding $L_3$ via the third diode $D_3$. The second resistor $R_2$, is connected in parallel with the second stepper motor winding $L_2$ via the second diode $D_2$, and with the fourth stepper motor winding $L_4$ via the fourth diode $D_4$.

These resistors $R_1$ and $R_2$ are used for release of the energies stored on the motor windings $L_1$–$L_4$. Therefore, instead of providing the resistor $R_1$ for both windings $L_1$ and $L_3$, and the resistor $R_2$ for both windings $L_2$ and $L_4$, as shown, four resistors could be provided, each connected in parallel with one winding and in series with one of the diodes $D_1$–$D_4$.

Also included in the FIG. 2 stepper motor driver circuit 7 is the excitation control circuit 23 connected to the bases of the switching transistors $Q_1$–$Q_4$. In response to the stepping pulses Sp delivered from the control circuit 9, FIG. 1, over the conductor 17, the excitation control circuit 23 generates the first to fourth phase excitation control signals $S_1$, $S_2$, $S_3$ and $S_4$ for application to the first to fourth switching transistors $Q_1$–$Q_4$, respectively. The resulting conductions of these transistors $Q_1$–$Q_4$ cause excitation of the associated motor windings $L_1$–$L_4$ and hence rotation of the rotor 19.

Figure 4:
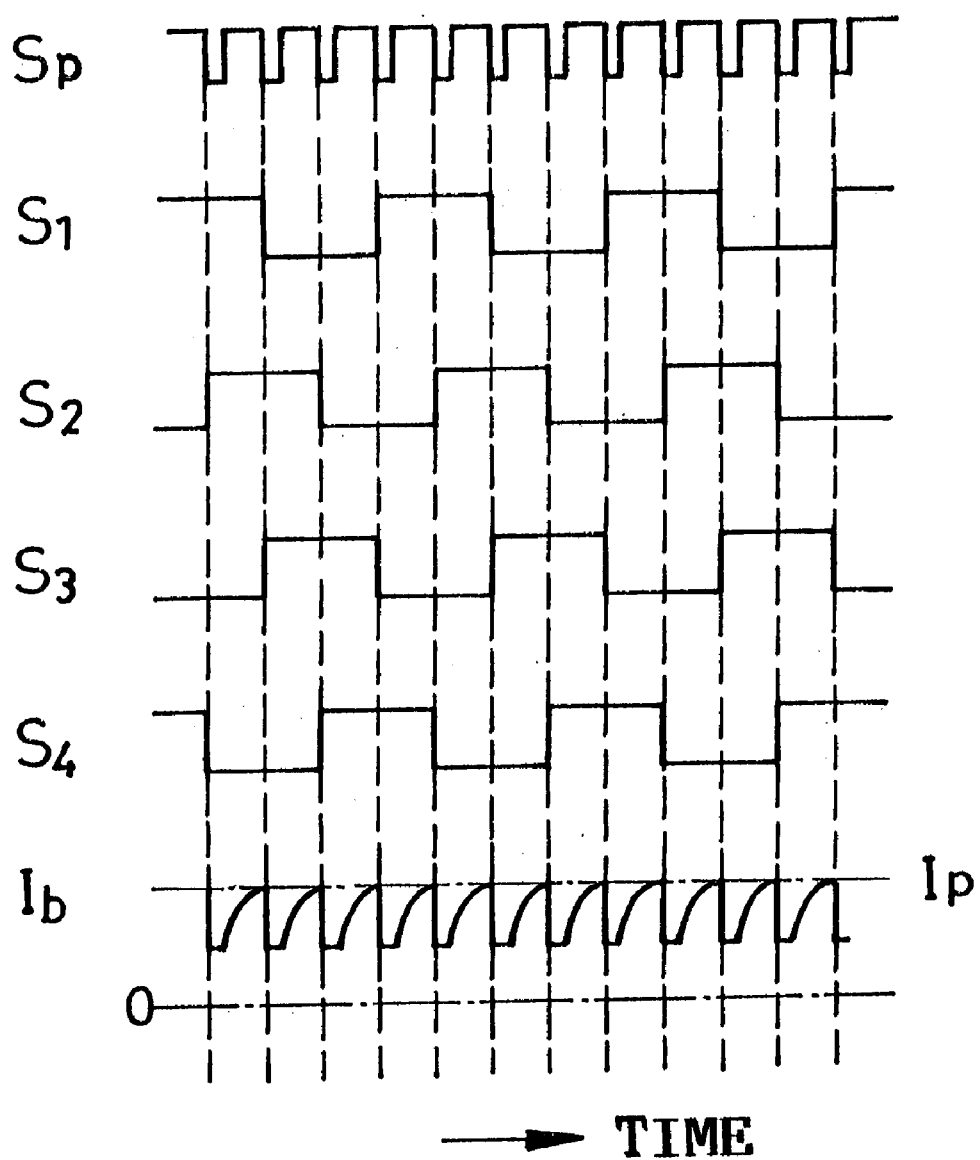
FIG. 4 is a diagram of waveforms useful in explaining the operation of the FIG. 3 stepper motor.

FIG. 4 is explanatory of how the excitation control signals $S_1$–$S_4$ are generated in predefined time relationship to each other in response to the stepping pulses Sp. It is understood that the stepper motor 16 is unipolar driven in a two-phase excitation mode in this particular embodiment of the invention. Thus, as will be noted from this figure, there are successive periods, each equal to one stepping pulse cycle, during which the first $S_1$ and second $S_2$ phase excitation control signals are both high, the second $S_2$ and third $S_3$ phase excitation control signals are both high, the third $S_3$ and fourth $S_4$ phase excitation control signals are both high, and the first $S_3$ and fourth $S_4$ phase excitation control signals are both high.

The excitation control circuit 23 also inputs the noted stepping direction signal from the interface and control circuit 9 over the line 18. This signal can cause a reversal in the sequence of conductions through the switching transistors $Q_1$–$Q_4$ and hence in the direction of rotation of the stepper motor 16.

With reference back to the disk drive diagram of FIG. 1 the read/write circuit 8 is connected between the pair of transducers 4 and 5 and the interface and control circuit 9. The read/write circuit 8 includes means for conventionally processing data read from the disk 1, and means for conventionally processing data to be written thereon.

Comprising a USB interface and an FDD controller, the interface and control circuit 9 is connected by way of two serial data transmission lines 24a and 24b to the connector 11 for connection to the unshown personal computer via unshown USB cables. The interface and control circuit 9 is conventionally equipped to generate the stepping pulses, stepping direction signal, motor-on signal, and many other standard signals, as well as write data, in response to a serial signal from the computer. The stepping pulses and stepping direction signal are sent over lines 17 and 18, respectively, to the stepper motor driver circuit 7. The motor-on signal is sent over a line 25 to the disk drive motor driver circuit 3. The write data is sent over a bus 26 to the read/write circuit 8. Further, inputting read data over the bus 26, the interface and control circuit 9 delivers the same toward the unshown computer.

Among many other functional components of the interface and control circuit 9, only the stepping pulse generator 27 and stepping direction signal generator 28 are indicated in FIG. 1 by reason of their pertinence to the instant invention. The stepping pulse generator 27 is equipped for production of stepping pulses at a variable rate, for delivery to the stepping motor driver circuit 7 over the line 17. This generator 27 is also connected by way of a bus 29 to the current detector circuit 13 in order to vary the stepping pulse rate according to the detected magnitude of the current Ia being consumed by the disk drive motor 2.

The connector 11 is shown connected to the power supply circuit 10 by way of a five-volt supply conductor 30a and ground conductor 30b which are to be connected to the supply bus of the USB cable. The connector 11 is also connected as aforesaid to the interface and control circuit 9 by way of two serial transmission conductors 24A and 24b which are to be connected to the signal bus of the USB cable.

The power supply circuit 10 provides a unidirectional 5.0-volt supply voltage on a line 31, and a unidirectional 4.3-volt supply voltage on a line 32. The 5.0-volt supply line 31 is connected to the supply terminal 3a of the disk drive motor driver circuit 3, and the 4.3-volt supply line 32 to the supply terminal 7a of the stepper motor driver circuit 7. Further, although not indicated in FIG. 1, it is understood that the 5.0-volt supply line 31 is additionally connected to the read/write circuit 8, the interface and control circuit 9, and other unshown parts such as pilot lamps.

The current detector element 12 and current detector circuit 13 are provided for detecting the input current Ia of the disk drive motor driver circuit 3. The input current Ia of the driver circuit 3 is equivalent to the current consumption of the disk drive motor 2. Connected to this current detector element 12, the current detector circuit 13 produces binary digital data representative of the detected magnitude of the disk drive motor current Ia, for delivery both to the stepping pulse generator 27 over a bus 29 and to the stepper motor driver circuit 7 over a bus 33.

The current detector circuit 13 is diagramed in more detail in FIG. 2, together with the current detector element 12 which is shown as a resistor serially inserted in the supply line of the disk drive motor driver circuit 3. Thus the resistor 12 will provide a voltage Va indicative of the input current of the disk drive motor 2. The current detector element could, however, be a current transformer, a Hall-effect element, or the like.

The current detector circuit 13 is intended to provide data indicative of the magnitude of the disk drive motor current Ia in terms of one of several predetermined levels during the normal speed rotation of the disk drive motor 2. In this particular embodiment the current detector circuit 13 is shown to comprise two comparators 41 and 42 and two reference voltage sources 43 and 44 for discerning three different levels of motor current magnitude. The first comparator 41 has one input connected to the current detector element 12, and another input to the first reference voltage source 43. The second comparator 42 has one input connected to the current detector element 12, and another input to the second reference voltage source 44.

The reference voltage sources 43 and 44 provide reference voltages $V_1$ and $V_2$, respectively, which correspond to two prescribed different levels of the disk drive motor current Ia For instance, the first reference voltage V, may correspond to 130 mA, and the second reference voltage $V_2$ to 230 mA.

Thus the comparators 41 and 42 of the current detector circuit 13 will be both low, logical "0," when the detected voltage Va, corresponding to the disk drive motor current Ia, is less than the first reference voltage $V_1$. The first comparator 41 will be high, or logical "1," and the second comparator 42 low, when the detected motor voltage Va is not less than the first reference voltage $V_1$ and less than the second reference voltage $V_2$. Both comparators 41 and 42 will be high when the detected motor voltage Va is greater than the first reference voltage $V_1$ and not less than the second reference voltage $V_2$.

The comparators 41 and 42 have their outputs 45 and 46 connected to the buses 29 and 33, conjointly providing two-bit output data for delivery to both stepping pulse generator 27, FIG. 1, and stepper motor driver circuit 7. The noted three levels of the detected motor voltage Va, corresponding to the motor current Ia, and the resulting two-bit output from the current detector circuit 13 may be summarized as follows:

If Va<$V_1$<$V_2$, or Ia<130 mA, then =[00].
If $V_1$<Va<$V_2$, or 130 mA<Ia<230 mA, then [0.]=[01].
If V3<$V_2$<Va, or 230 mA<Ia, then [B.]=[11].

Inputting the above two-bit data from the current detector circuit 13, the stepping pulse generator 27 will put out stepping pulses at any of three different stepping rates depending upon the magnitude of the current Ia being consumed at that time by the disk drive motor 2.

Figure 5:
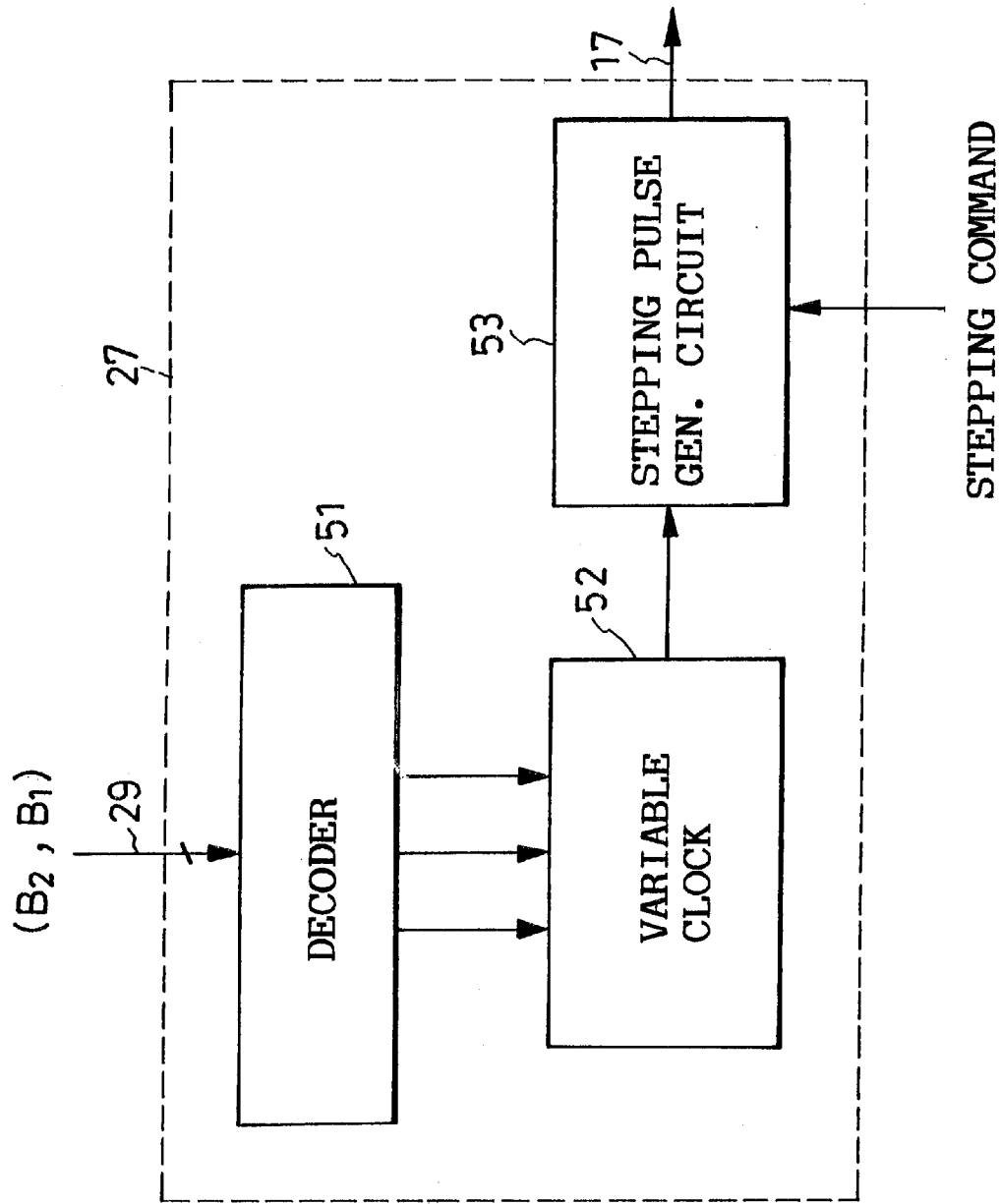
FIG. 5 is a block diagram of the stepping pulse generator used in the FIG. 1 disk drive.

FIG. 5 shows a preferred construction of the stepping pulse generator 27. Included is a decoder 51 connected to the two-bit output bus 29 of the current detector circuit 13 for decoding the output [$B_2B_1$] therefrom. Connected to this decoder 51, a variable frequency clock 52 is designed to put out clock pulses at one of three predetermined different rates depending upon the decoded input [$B_2B_1$]. A pulse generator circuit 53 responds to these clock pulses by generating stepping pulses at a corresponding stepping rate.

Typically, the current detector circuit output [$B_2B_1$] and the stepping rate (stepping pulse period) may be correlated as follows:

Three milliseconds per step when [$B_2B_1$]=[00], or Ia<130 mA.
Four ms/step when [$B_2B_1$]=[01], or 130 mA≦Ia<230 mA.
Five ms/step when [$B_2B_1$]=[11], or 230 mA≦Ia.

Figure 6:
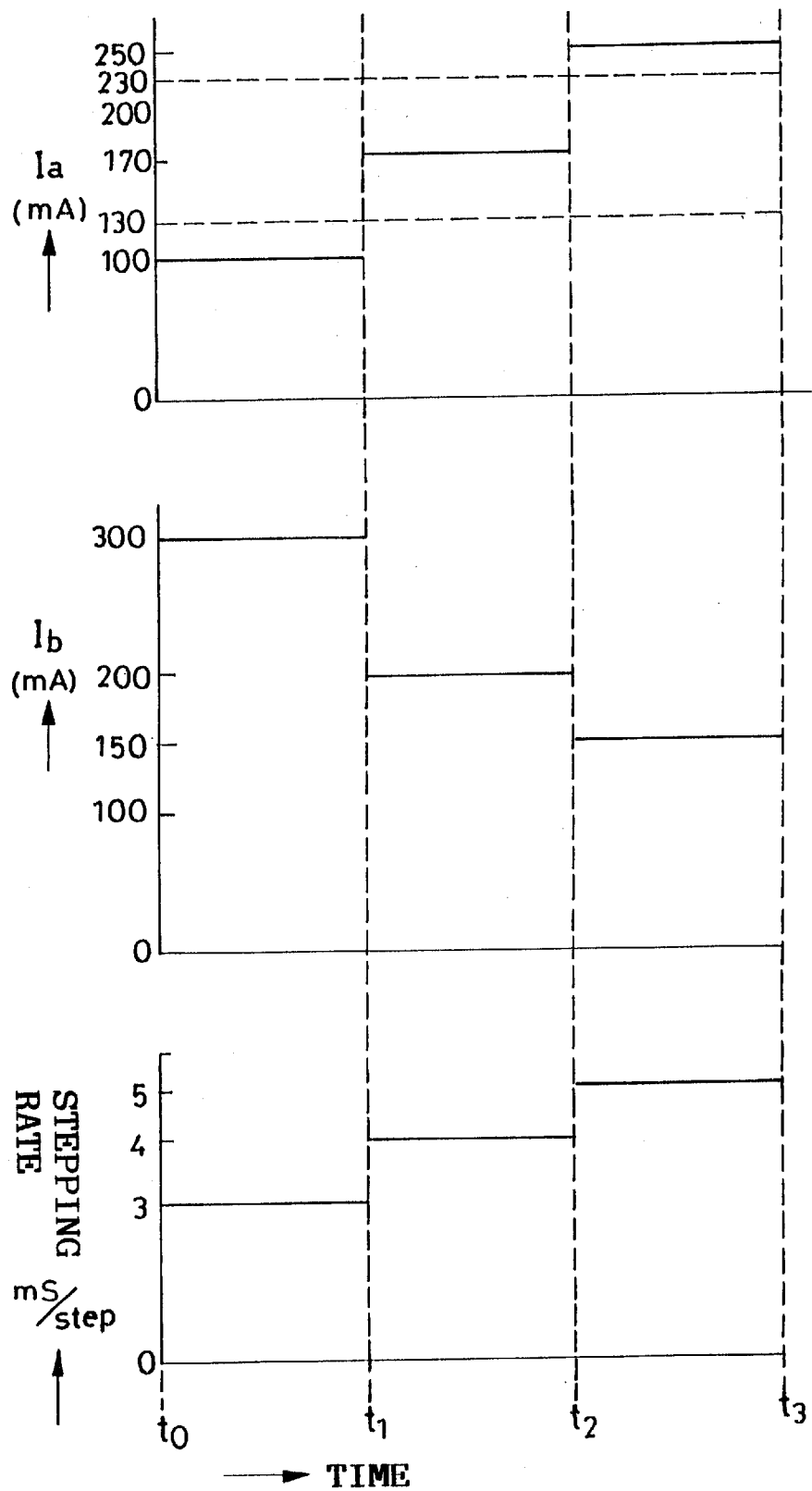
FIG. 6 is a set of interrelated graphs showing how the disk drive motor current, the stepper motor current, and the seek speed change for disks of three different weight categories to be interchangeably loaded in the FIG. 1 disk drive.

These correlations, as well as the resulting stepper motor current Ib, are graphically represented in FIG. 6. It will be observed that the stepping rate changes by discrete increments in direct proportion to the disk drive motor current Ia The stepper motor current Ib changes in inverse proportion to the disk drive motor current Ia Thus, with the higher stepper motor current Ib and the shorter stepping rate, the seek speed grows higher for lighter disks.

Referring more specifically to FIG. 6, the $t_1-t_2$ period. in this graph presupposes use of a disk of an average weight class, such that the current consumption Ia of the disk drive motor 2 is not less than 130 mA and less than 230 mA. The resulting stepping rate is four ms/step, with the result that the current consumption of the stepper motor 15 is 200 mA.

A disk of a lighter weight class is assumed to be used from $t_0$ to $t_1$ in FIG. 6, such that the disk drive motor 2 consumes a current Ia of less than 130 mA. The stepping rate is then three ms/step, making the current consumption Ib of the stepper motor 15 as high as 300 mA.

A disk that is used from $t_2$ to $t_3$ in FIG. 6 falls in the heaviest weight class, such that the current requirement Ia of the disk drive motor 2 is not less than 230 mA. The stepping rate is then controlled to be five ms/step, which makes the current consumption Ib of the stepper motor 15 as low as 150 mA.

In prior art disk drives designed for USB interfacing with PCs, the stepper motor current Ib and the stepping rate have been predetermined as from $t_2$ to $t_3$ in FIG. 6, on the assumption that the disks to be loaded therein are all of the heaviest weight class. The resulting seek speed has been too low not only for the lightweight disks of the $t_0-t_1$ period and but for the average weight disks of the $t_1-t_2$ period as well.

By contrast, according to the instant invention, the stepper motor current Ib is increased for lightweight disks and average weight disks by amounts approximately equal to the drops in the disk drive motor current Ia taking place when such disks are loaded. Further the stepping rate is lowered for such disks. Thus is the seek speed made appreciably higher than heretofore for the lightweight and average weight disks without in any way augmenting the total instantaneous current consumption of the disk drive.

Figure 7:
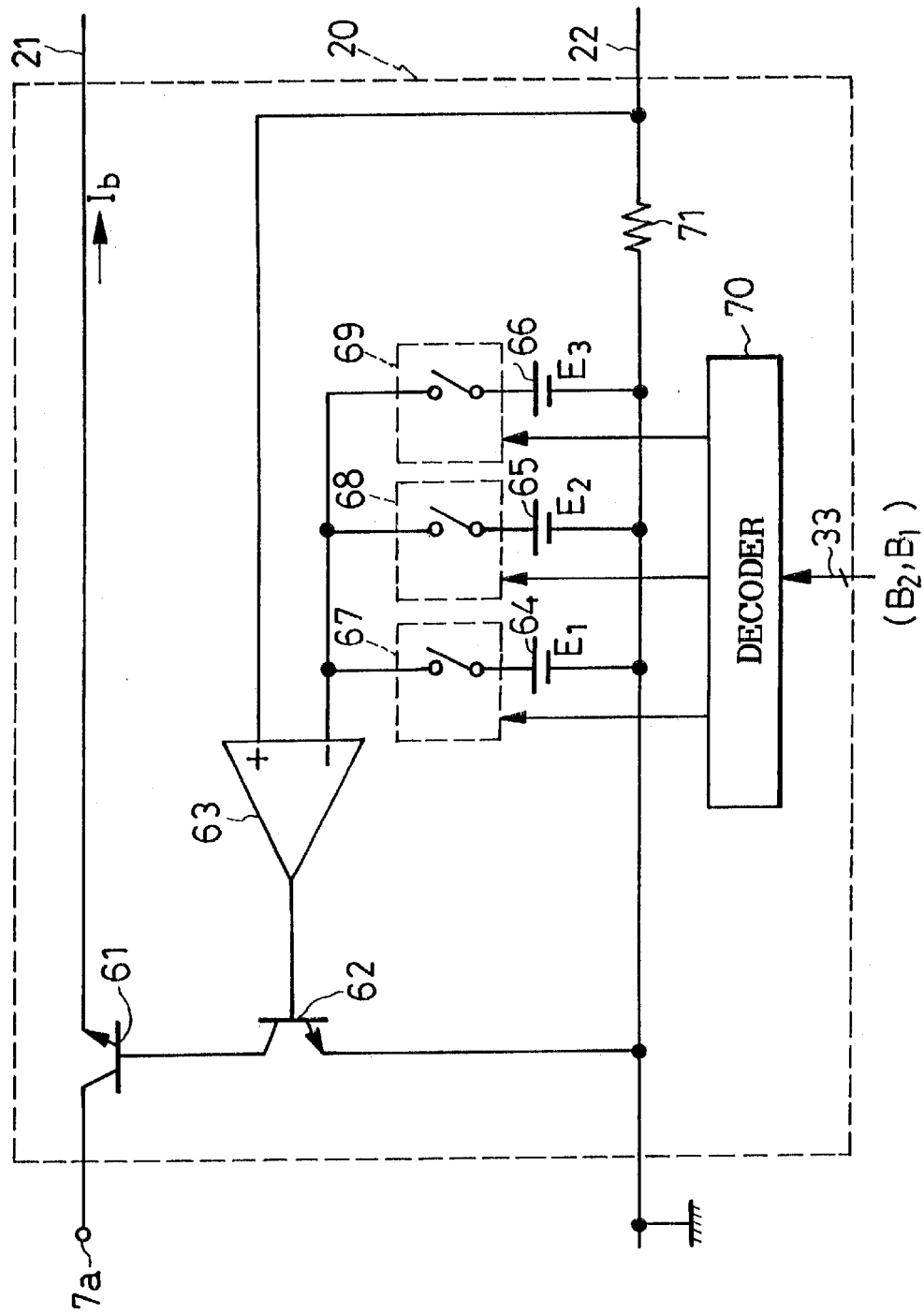
FIG. 7 is a schematic electrical diagram showing in more detail the stepper motor current control circuit included in the FIG. 3 stepper motor driver circuit.

Reference is now directed to FIG. 7 for discussion of how the current control circuit 20 of the FIG. 3 stepper motor driver circuit 7 is configured for automatically setting the stepper motor current Ib at one of the three different levels of FIG. 6 according to the current Ia being drawn by the disk drive motor 2. The current control circuit 20 includes a current control transistor 61 serially inserted in the stepper motor supply line 21 to act as a variable resistor. The base of this current control transistor 61 is grounded via another transistor 62 (hereinafter referred to as the base control transistor).

Connected to the base of the base control transistor 62, a differential amplifier 63 has one input connected to one extremity of a current detector resistor 71 on the grounded supply line 22, and another input to three reference voltage sources 64, 65 and 66 via respective on-off switches 67, 68 and 69. The sources 64–66 provide reference voltages $E_1$, $E_2$ and $E_3$ corresponding respectively to the three predetermined levels of FIG. 6, 300 mA, 200 mA and 150 mA, of the stepper motor current Ib. The switches 67–69 are to be individually turned on and off under the control of a decoder 70 which is connected to the output bus 33 of the current detector circuit 13, FIGS. 1 and 2, for decoding the digital data [$B_2B_1$].

In the operation of the stepper motor current control circuit 20, the first switch 67 is on when [$B_2B_1$]=[00], that is, when a disk of the lightweight class is loaded. The second switch 68 is on when [$B_2B_1$]=[01], that is, when a disk of the average weight class is loaded. The third switch 69 is on when [$B_2B_1$]=[11], that is, when a disk of the heavy weight class is loaded. Thus the current control transistor 61 has its resistance value changed in three levels according to the weight class of each disk loaded, causing the stepper motor current Ib to vary in as many levels.

Although the stepper motor current Ib is shown as flat in FIG. 6, actually it varies with a time constant during each stepping pulse cycle as pictured in FIG. 4, because the stepper motor windings $L_1-L_4$, FIG. 3, are inductive. Therefore, in the FIG. 7 stepper motor current control circuit 20, the peak value Ip, FIG. 4, of the stepper motor current Ib should be construed to be controlled.

It will be appreciated in connection with the stepper motor current control circuit 20 that the stepper motor current Ib is detected by the current detector resistor 71 for feedback control. The peak value Ip of the stepper motor current Ib can thus be set at any of the three desired levels.

Despite the showing of FIG. 7, however, the decoder 70 of the stepper motor current control circuit 20 could be omitted, and the switches 67–69 controlled by outputs from the decoder 51, FIG. 5, which is shown included in the stepping pulse generator 27. Another possible modification of the FIG. 5 circuitry is not to make feedback control of the stepper motor current Ib. In that case one input of the differential amplifier 63 may be connected to an additional reference voltage source, or, with this differential amplifier omitted altogether, the three switches 67–69 may be connected directly to the base of the base control transistor 62.

Figure 8:
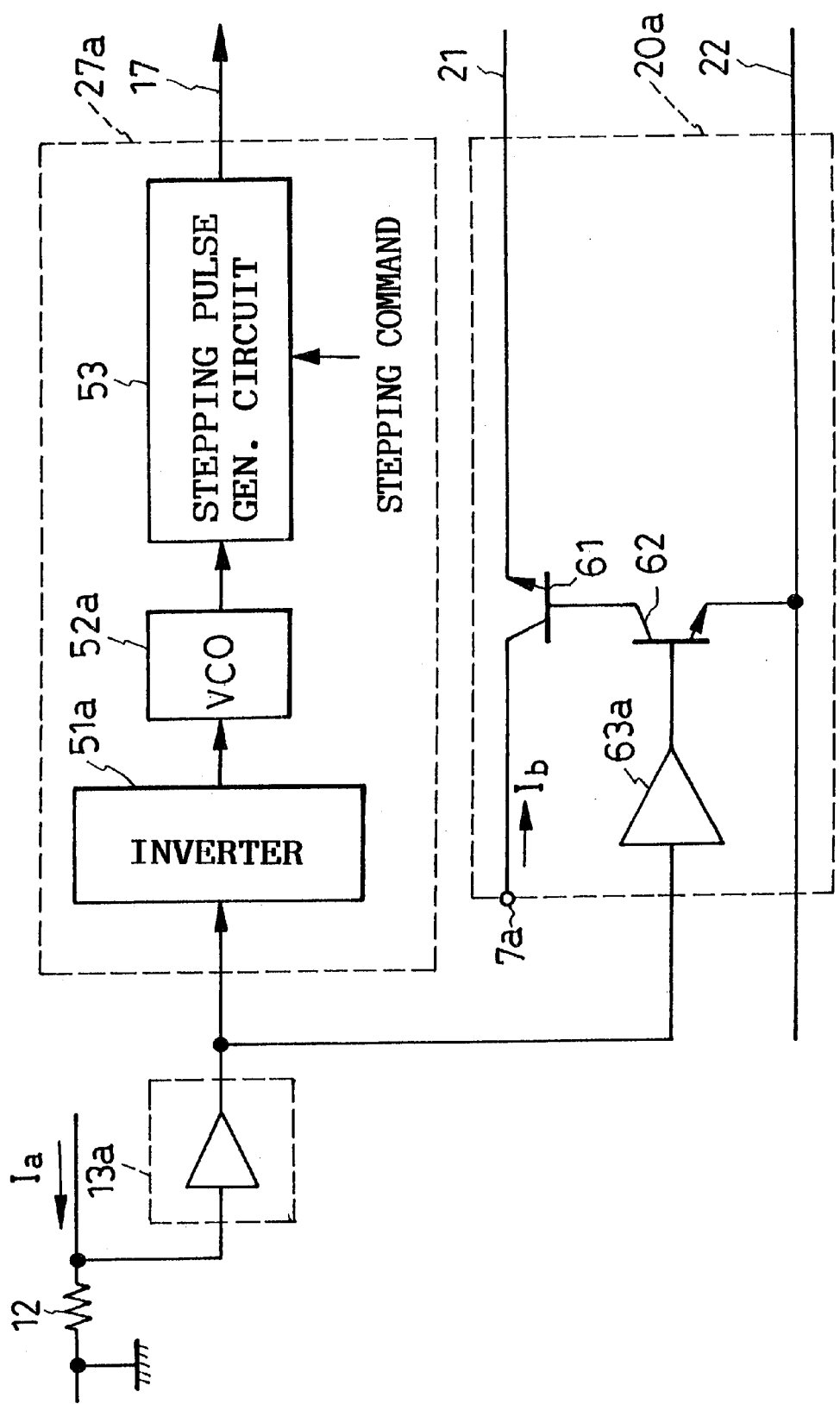
FIG. 8 is a schematic electrical diagram, partly in block form, of a modified disk drive motor current detector means, modified stepping pulse generator, and modified stepper motor current control circuit, constituting another preferred embodiment of the invention.

FIG. 8 illustrates another preferred embodiment of the invention, comprising a modified current detector 13a, a modified stepper motor current control circuit 20a, and a modified stepping pulse generator 27a, in places of their respective counterparts 13, 20 and 27 of the FIGS. 1–7 embodiment. The other components of this alternative embodiment can be the same as those of the foregoing embodiment.

The modified current detector 13a is shown as an amplifier for amplifying the voltage across the resistor 12 for detecting the disk drive motor current Ia The amplified voltage is sent to both stepping pulse generator 27a and stepper motor current control circuit 20a.

The modified stepping pulse generator 27a is a serial connection of an inverter circuit 51a, a voltage controlled oscillator (VCO) 52a, and the stepping pulse generator circuit 53. The inverter circuit 51a is of known construction capable of providing an output voltage inversely proportional to the output voltage of the current detector 13a. The VCO 52a puts out clock pulses at a recurrence rate depending upon the output voltage of the inverter circuit 51a. Instead of the separate inverter circuit 51a and VCO 52a, however, there could be employed a VCO capable of generating clock pulses at a rate inversely proportional to the output voltage of the current detector 13a. The stepping pulse generator circuit 53 can be of the same construction as that indicated by the same reference numerals in FIG. 5.

The modified stepper motor current control circuit 20a comprises the same transistors 61 and 62 as does the first disclosed current control circuit 20 shown in FIG. 7. The base control transistor 62 of this modified circuit 20a, however, has its base connected directly to the current detector amplifier 13a via a buffer amplifier 63a.

Thus, in this FIG. 8 embodiment, the disk drive motor current Ia is detected not in discrete steps but continuously. The resulting stepping rate and current consumption of the stepper motor 15 also vary continuously. Therefore, as will be apparent from the foregoing operational description of the FIGS. 1–7 embodiment, an optimum stepping rate and a optimum stepper motor current Ib will be automatically determined for each specific value of the disk drive motor current Ia, making it possible to maximize the seek speed while the peak current consumption of the disk drive is held not more than 500 mA.

Figure 9:
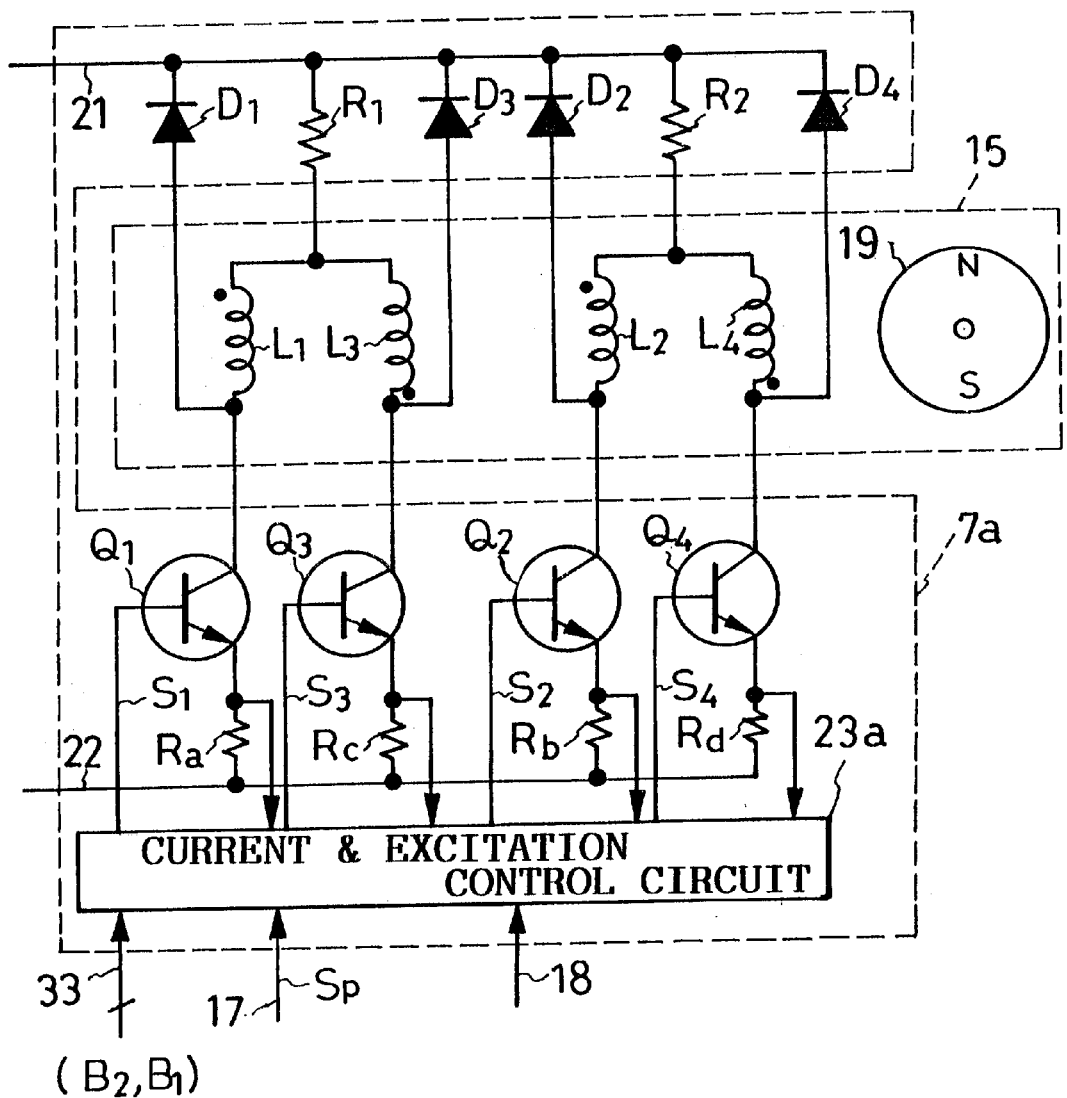
FIG. 9 is a schematic electrical diagram of a modification of the stepper motor driver circuit of the FIG. 1 disk drive, the modified driver circuit being shown together with the stepper motor.

In FIG. 9 is shown a modification 7a of the FIG. 3 stepper motor driver circuit 7. The modified stepper motor driver circuit 7a is akin to its FIG. 3 counterpart except for the addition of four current detecting resistors Ra, Rb, Rc and Rd and the integration of the FIG. 3 current control circuit 20 and FIG. 3 excitation control circuit 23 into a current and excitation control circuit 23a. The current detecting resistors Ra–Rd are connected respectively between the transistors $Q_1$–$Q_4$ and the ground. The thus obtained signals indicative of the various phase motor currents are directed into the current and excitation control circuit 23a thereby to be used for feedback control.

The current and excitation control circuit 23a additionally inputs the stepping pulses and the stepping direction signal from the interface and current detector circuit 9, FIG. 1, over the line 18, and the two-bit output [$B_2B_1$] from the disk drive motor current detector circuit 13 over the bus 33. This control circuit 23a determines the periods of conduction through the transistors $Q_1$–$Q_4$ in response to the stepping pulses, and controls the values of resistance offered by the transistors $Q_1$–$Q_4$ in response to the detected disk drive motor current magnitude.

Thus, in this second alternative embodiment, the transistors $Q_1$–$Q_4$ are utilized not only for excitation control of the stepper motor windings but also, like the FIG. 7 transistor 61, for control of the peaks of the excitation currents. With the FIG. 9 circuit configuration, therefore, no dedicated transistors are needed for control of the stepper motor current Ib.

Despite the foregoing detailed disclosure it is not desired that the present invention be limited by. the exact showing of the drawings or the description thereof. A variety of modifications or alterations of the illustrated embodiments will suggest themselves to one skilled in the art to conform to design preferences or to the requirements of each specific application of the invention.

For instance, the stepper motor could be driven in the known one-phase or one-two-phase excitation mode instead of the two-phase excitation mode employed in the illustrated embodiment. Further the stepper motor itself could be replaced by other motors such as a linear motor. It is also understood that the invention finds application not just to flexible magnetic disk drives but to other types of magnetic disk drives as well as optical disk drives. It is therefore appropriate that the invention be construed broadly and in a manner consistent with the fair meaning or proper scope of the claims which follow.

What is claimed is:

1. A data storage apparatus for use with interchangeable data storage disks of potentially different weights, each such disk being replaceably loaded in the apparatus, comprising:
    (a) a disk drive motor for imparting rotation to a data storage disk loaded in the apparatus, the disk drive motor having a different current requirement depending upon the weight of the disk to be driven;
    (b) a transducer for data transfer with the rotating data storage disk;
    (c) a positioning motor for moving the transducer across track turns on the disk;
    (d) current detector means for detecting the magnitude of an electric current being consumed by the disk drive motor when the latter is driving the loaded data storage disk at a prescribed speed;
    (e) current control means connected between the current detector means and the positioning motor for varying the magnitude of a current supplied to the positioning motor in inverse proportion to the magnitude of the current being consumed by the disk drive motor; and
    (f) speed control means connected between the current detector means and the positioning motor for varying the speed of rotation of the positioning motor in inverse proportion to the magnitude of the current being consumed by the disk drive motor.

2. The data storage apparatus of claim 1 wherein the current detector means comprises:
    (a) a current detector for providing a motor voltage corresponding to the motor current being consumed by the disk drive motor; and
    (b) a plurality of comparators each connected to the current detector for comparing the motor voltage with a prescribed different reference voltage, the comparators conjointly providing digital data indicative of a plurality of predetermined different levels of the motor current.

3. The data storage apparatus of claim 2 wherein the current control means comprises:
    (a) a variable resistor for varying the magnitude of the current supplied to the positioning motor;
    (b) circuit means connected to the variable resistor for causing the same to vary the magnitude of the current supplied to the positioning motor in as many predetermined different levels as there are levels of the motor current indicated by the current detector means; and
    (c) a decoder connected between the current detector means and the circuit means of the current control means for choosing one of the levels of the current to be supplied to the positioning motor according to the particular level of the motor current indicated by the current detector means.

4. The data storage apparatus of claim 3 wherein the circuit means of the current control means comprises:
 (a) a plurality of reference voltage sources for providing a set of predetermined different reference voltages corresponding to the predetermined levels of the current to be supplied to the positioning motor; and
 (b) switch means for choosing one of the reference voltages under the control of the decoder.

5. The data storage apparatus of claim 4 wherein the circuit means of the current control means further comprises:
 (a) a second current detector for providing a positioning motor voltage corresponding to the current being consumed by the positioning motor;
 (b) a comparator having a first input connected to the second current detector and a second input connected to the reference voltage sources via the switch means; and
 (c) circuit means connected between the comparator and the variable resistor for varying the resistance value of the latter according to the output from the comparator.

6. The data storage apparatus of claim 2 wherein the positioning motor is a stepper motor which rotates by discrete increments in response to stepping pulses, and wherein the speed control means comprises:
 (a) a decoder connected to the current detector means for decoding the digital data;
 (b) a variable clock connected to the: decoder for generating clock pulses at a recurrence rate corresponding to the level of the current being consumed by the disk drive motor; and
 (c) a clock pulse generator connected to the variable clock for generating stepping pulses at a recurrence rate determined by that of the clock pulses.

7. The data storage apparatus of claim 1 wherein the current control means comprises:
 (a) a variable resistor for varying the magnitude of the current supplied to the positioning motor; and
 (b) circuit means connected between the current detector means and the variable resistor for causing the latter to infinitely vary the magnitude of the current supplied to the positioning motor according to the magnitude of the current being consumed by the disk drive motor.

8. The data storage apparatus of claim 1 wherein the positioning motor is a stepper motor which rotates by discrete increments in response to stepping pulses, and wherein the speed control means comprises:
 (a) an inverter circuit connected to the current detector means for providing an output voltage inversely proportional to a voltage supplied therefrom;
 (b) a voltage controlled oscillator connected to the inverter circuit for providing clock pulses at a recurrence rate depending upon the output voltage thereof; and
 (c) a clock pulse generator connected to the voltage controlled oscillator for generating stepping pulses at a recurrence rate determined by that of the clock pulses.

9. A data storage apparatus for use with interchangeable data storage disks of potentially different weights, each such disk being replaceably loaded in the apparatus, comprising:
 (a) a disk drive motor for imparting rotation to a data storage disk loaded in the apparatus, the disk drive motor having a different current requirement depending upon the weight of the disk to be driven;
 (b) a disk drive motor driver circuit for controllably driving the disk drive motor;
 (c) a transducer for data transfer with the rotating data storage disk;
 (d) a stepper motor for moving the transducer across track turns on the disk;
 (e) a stepper motor driver circuit for controllably driving the stepper motor
 (f) a control circuit for supplying stepping pulses and a stepping direction signal to the stepper motor driver circuit;
 (g) a power supply circuit separately connected to the disk drive motor driver circuit and to the stepper motor driver circuit for powering the disk drive motor and the stepper motor;
 (h) current detector means connected between the power supply circuit and the disk drive motor driver circuit for detecting the magnitude of an electric current being consumed by the disk drive motor when the latter is driving the loaded data storage disk at a prescribed speed;
 (i) a current control circuit included in the stepper motor driver circuit and connected to the current detector means for varying the magnitude of a current consumed by the stepper motor in inverse proportion to the magnitude of the current being consumed by the disk drive motor; and
 (j) a stepping pulse generator included in the control circuit and connected to the current detector means for varying the period of the stepping pulses in proportion to the magnitude of the current being consumed by the disk drive motor;
 (k) whereby the speed of rotation of the stepper motor varies in inverse proportion to the magnitude of the current being consumed by the disk drive motor.

10. The data storage apparatus of claim 9 wherein the current detector means comprises at least two comparators for comparing the detected magnitude of the disk drive motor current with prescribed values and conjointly providing a digital output indicative of a plurality of predetermined different levels of the disk drive motor current.

* * * * *